United States Patent [19]

Renoux

[11] 4,243,367
[45] Jan. 6, 1981

[54] DEVICE FOR PRESSING OBJECTS MADE FROM A THERMOPLASTIC MATERIAL, AND PARTICULARLY PHONOGRAPHIC RECORDS

[75] Inventor: Robert A. Renoux, Poissy, France

[73] Assignee: Societe Anonyme de Techniques Audio-Visuelles S.A.T.A.V., France

[21] Appl. No.: 89,211

[22] Filed: Oct. 29, 1979

[30] Foreign Application Priority Data

Nov. 16, 1978 [FR] France .................................. 78 32344

[51] Int. Cl.² ........................ B29C 3/00; B29C 17/00; B29D 17/00
[52] U.S. Cl. .................................. 425/385; 425/810; 425/411
[58] Field of Search ............... 425/383, 384, 385, 406, 425/407, 411, DIG. 44, 810

[56] References Cited

U.S. PATENT DOCUMENTS

| | | | |
|---|---|---|---|
| 2,998,622 | 9/1961 | Renoux | 425/810 |
| 3,819,315 | 6/1974 | Borchard et al. | 425/810 |
| 3,883,109 | 5/1975 | Hahne | 425/DIG. 44 |
| 4,145,169 | 3/1979 | Shows | 425/810 |

*Primary Examiner*—J. Howard Flint, Jr.
*Attorney, Agent, or Firm*—Cesari and McKenna

[57] ABSTRACT

The present invention provides a device for pressing objects made from a thermoplastic material, of the type comprising a mould with a die support plate floatably mounted on an elastomer. The die support plate is formed from at least two parts movable in relation to each other, each of these parts supporting a distinct die and bearing separately on the elastomer.

2 Claims, 1 Drawing Figure

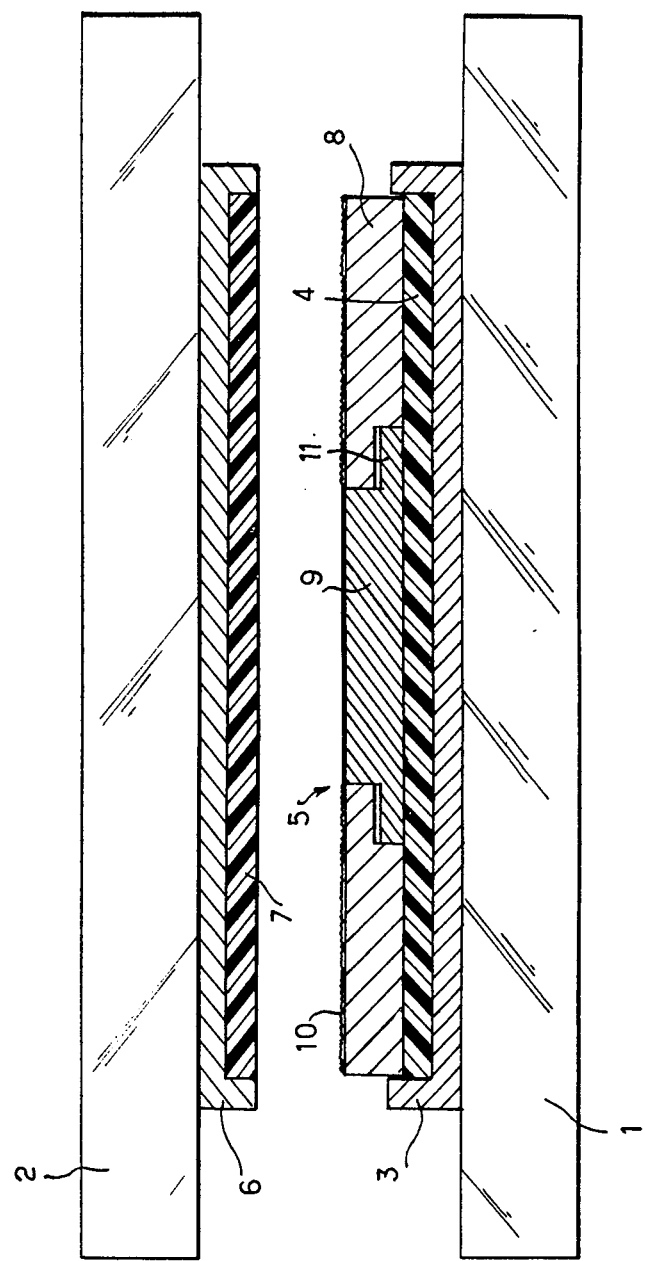

DEVICE FOR PRESSING OBJECTS MADE FROM A THERMOPLASTIC MATERIAL, AND PARTICULARLY PHONOGRAPHIC RECORDS

The present invention relates to a pressing device, intended more particularly for phonographic records, of the kind comprising a mould with a die support plate mounted floatably on an elastomer.

In conventional pressing devices, the resistant pressure is uniformly spread over the whole surface of the dies and equal to the initial pressure. Now, it is known that in some cases, and depending on the nature of the object to be pressed, there are certain portions of the dies which present moulding difficulties and where it would in particular be desirable to have a higher pressure. This is the case particularly with the central part of phonographic records, on which the title of the record or some sort of centring means may be cut.

The principal aim of the present invention is then to provide a pressing device in which the mould comprises zones having pressures different from each other, calculated so as to obtain an optimal impression at precise points of the dies.

For this purpose, the pressing device of the invention is essentially characterized in that the die support plate is formed from at least two parts, movable in relation to each other, each of these parts supporting a distinct die and bearing separately on the elastomer. It will be readily understood that it is thus possible to obtain very easily different pressure zones, by simply playing on the dimensions of the surfaces bearing against the elastomer.

In a particular application of the invention for pressing phonographic records, one of the parts of the plate is formed by an annular member supporting the die for pressing the grooves of the record, whereas the other part is formed by a central member housed in a corresponding recess of the annular member, the central member carrying the impression for moulding the centre of the record and bearing on the elastomer through an appropriately sized sole-piece.

With this arrangement, it is obviously possible to obtain in the centre of the record a higher moulding pressure which will in fact depend essentially on the ratio between the upper surface of the central member and the surface of its bearing sole-piece.

One embodiment of the invention is described hereafter by way of example, with reference to the accompanying drawing in which the single FIGURE is a schematic sectional view of a pressing device in accordance with the invention, in its application to phonographic records.

This pressing device comprises first of all a lower counter plate 1 and an upper counter plate 2, capable of being mounted in a press (not shown).

The lower counter plate 1 supports a container 3 inside which an elastomer 4 is maintained compressed so that its reactive pressures are equal to the initial pressures. On this elastomer 4 is floatably mounted a die support plate, also called "glass" and which is shown as a whole by the reference 5.

The upper counter plate 2 is also fitted with a container 6, enclosing an elastomer 7 whose Shore hardness is about 30% greater than that of the elastomer contained in the lower container 3, so as to equalize the pin-point pressures at the surface of the object to be moulded which is formed, in the case in question, by a phonographic record.

In accordance with the invention, the plate or "glass" is formed from two distinct parts movable in relation to each other, i.e. an annular part 8 and a central part 9.

The annular part 8 supports the principal die 10, also of annular shape, intended for pressing the grooves of the record. In the space thus provided in the centre there is slidably mounted a central part 9 on which will be directly cut the title of the record or some sort of centring means. This central member 9 bears on the elastomer 4 through a sole-plate 11.

The pressing of the grooves of the record and the pressing of its central part are thus entirely dissociated. Moreover, the pressure available on the central die 9 will be higher than the pressure available on the annular die 10, because of the presence of the bearing sole 11 whose area is judiciously calculated depending on the relative pressure desired. Of course, the thickness of this sole-piece will be smaller than that of the corresponding housing provided in annular member 8, to allow free pressure equalization of said die.

The pressing device of the invention allows then in short a better impression of the central part of a phonographic record to be obtained. It is evident that such a device could also be applied advantageously to the pressing of other objects made from a thermoplastic material, whenever particular moulding difficulties require a higher pressure at precise points of the dies.

What is claimed is:

1. A device for pressing objects made from a thermoplastic material, of the type comprising a mould with a die support plate floatably mounted on an elastomer, characterized in that said plate is formed from at least two parts movable in relation to each other, each of these parts supporting a distinct die and bearing separately on the elastomer.

2. A pressing device according to claim 1, applied to the case of phonographic records, characterized in that one of the parts of the plate is formed by an annular member supporting the die intended for pressing the grooves of the record, whereas the other part is formed by a central member housed in a corresponding recess in the annular member, this central member carrying the impression for moulding the centre of the record and bearing on the elastomer through an appropriately sized sole-piece.

* * * * *